United States Patent
Mueller et al.

(10) Patent No.: US 8,024,924 B2
(45) Date of Patent: Sep. 27, 2011

(54) DRIVE HAVING AN ENERGY RECOVERY AND RETARDER FUNCTION

(75) Inventors: Matthias Mueller, Neusaess (DE); Steffen Mutschler, Ulm (DE); Martin Behm, Ulm (DE)

(73) Assignee: Bosch Rexroth AG, Stuttgart (DE)

( * ) Notice: Subject to any disclaimer, the term of this patent is extended or adjusted under 35 U.S.C. 154(b) by 626 days.

(21) Appl. No.: 12/158,373

(22) PCT Filed: Dec. 20, 2006

(86) PCT No.: PCT/EP2006/012352
§ 371 (c)(1),
(2), (4) Date: Jun. 20, 2008

(87) PCT Pub. No.: WO2007/076942
PCT Pub. Date: Jul. 12, 2007

(65) Prior Publication Data
US 2008/0295507 A1    Dec. 4, 2008

(30) Foreign Application Priority Data
Dec. 23, 2005    (DE) .......................... 10 2005 061 990

(51) Int. Cl.
*B60T 1/093*    (2006.01)
*F15B 21/04*    (2006.01)

(52) U.S. Cl. ............................................ 60/414; 60/456
(58) Field of Classification Search ................... 60/414, 60/418, 456; 180/165, 306; 477/40
See application file for complete search history.

(56) References Cited

U.S. PATENT DOCUMENTS
7,273,122 B2 *   9/2007   Rose ............................ 180/165
2006/0068970 A1   3/2006   Rose FOREIGN PATENT DOCUMENTS
DE           32 47 335 A1     9/1983
EP            0 248 178 A1   12/1987
WO      WO 2004/026607 A1    4/2004

* cited by examiner

*Primary Examiner* — Thomas E Lazo
(74) *Attorney, Agent, or Firm* — Scully, Scott, Murphy & Presser, P.C.

(57) ABSTRACT

The invention relates to a drive with an energy recovery and retarder function. The drive (1) comprises a hydrostatic piston engine (12) which is connected to an accumulator (16) for storing pressure energy and to a pressure limiting valve (19) for generating a braking action. Arranged downstream of the pressure limiting valve (19) is a cooler (45). The drive (1) also comprises a hydraulic motor (35) for driving a cooler fan (33), wherein the hydraulic motor (35) is acted on with a pressure medium which is delivered by the hydrostatic piston engine (12).

16 Claims, 2 Drawing Sheets

DRIVE HAVING AN ENERGY RECOVERY AND RETARDER FUNCTION

BACKGROUND

The invention relates to a drive having an energy recovery and retarder function.

In utility vehicles, such as, for example, construction site vehicles or fork lift trucks, the vehicle is often accelerated and subsequently braked again during working operation. In addition to the primary drive, working hydraulic units are provided in most cases and are operated by means of an additional hydrostatic piston engine. For the driving operation, these hydrostatic piston engines can be connected to the drive and consequently to the primary energy source of the drive. In order to store the energy which is released during the braking of either an operating device or the travel drive, it is known from DE 32 47 335 C2 to connect a store to the hydrostatic piston engine. By charging the store, kinetic energy is converted into pressure energy. To this end, the hydrostatic piston engine draws pressure medium from a pressure medium reservoir and conveys it into the store with the pressure being increased. Owing to the increasing pressure as the pressure medium is conveyed, the vehicle or the operating device is subjected to a braking effect. In addition, it is possible to use a pressure limitation valve in order to brake the operating device or the vehicle. The pressure medium conveyed by the hydrostatic piston engine is depressurised via the pressure limitation valve.

The drive known from DE 32 47 335 C2 has the disadvantage that, for example, in the event of a relatively long hill start, the capacity of the store is reached. Further braking of the vehicle or only maintaining the selected travel speed by conveying pressure medium counter to the pressure in the store then becomes impossible. In order to achieve an adequate braking effect, the corresponding kinetic energy at the pressure limitation valve must consequently be converted into heat. This leads to a significant rise in the temperature of the pressure medium.

SUMMARY

The object of the invention is to provide a drive having an energy recovery and retarder function, wherein the retarder function is improved so that it is also possible to make use of a braking effect for a long period of time.

The drive according to an aspect of the invention comprises a hydrostatic piston engine which is connected to a store in order to store pressure energy. Furthermore, the hydrostatic piston engine is connected to a pressure limitation valve in order to produce a braking effect. In order to improve the retarder function, a cooler is provided downstream of the pressure limitation valve. The cooling performance of this cooler is increased using a cooler fan. In order to drive the cooler fan, a hydraulic motor is provided which is also acted on with the pressure medium conveyed by the hydrostatic piston engine.

On the drive proposed, it is advantageous for energy which is freely available to be used to drive the hydraulic motor. An additional driving operation, for example, using an electric motor, can consequently be dispensed with. The energy for driving the hydraulic motor is produced in each case by means of the hydrostatic piston engine. Each time a braking operation is initiated, there is consequently at the same time sufficient energy provided to drive the hydraulic motor.

Advantageous developments of the drive according to the invention are set out in the subsidiary claims.

In particular, a simple configuration of the drive is produced if the cooler is connected to the pressure limitation valve by means of a discharge line. Furthermore, a pretensioned non-return valve is arranged in the discharge line. An additional pressure level is therefore provided upstream of the pretensioned non-return valve and is above the pressure level of the completely depressurised tank volume. In a simple configuration, the hydraulic motor may be directly connected to the discharge line upstream of the non-return valve. By acting on the inlet connection of the hydraulic motor with the pressure of the discharge line upstream of the pretensioned non-return valve, the hydraulic motor is always driven when a braking effect is produced by means of the pressure limitation valve. However, if the pressure limitation valve closes because a braking effect is not required, the cooler fan also automatically stops. It is therefore not necessary to have a separate control for the cooler speed or to switch the cooler fan drive on or off.

According to another preferred embodiment, the hydrostatic piston engine, which draws pressure medium from the tank in order to produce the braking effect, is connected to a supply line. The hydrostatic piston engine conveys the pressure medium into the supply line by means of which the store and the pressure limitation valve are connected. The hydraulic motor can preferably be connected to the supply line. Owing to the possibility of connecting the hydraulic motor to the supply line, a higher input pressure is provided for driving the hydraulic motor so that hydraulic motors having a higher power level can also be used. A toothed wheel motor is preferably used as a hydraulic motor.

In order to connect the hydraulic motor to the supply line, a releasable non-return valve is preferably provided. The releasable non-return valve ensures that the hydraulic motor is not automatically switched on by producing a supply pressure in the supply line by means of the hydrostatic piston engine. Instead, the time at which the releasable non-return valve is released is independent of a pressure build-up using the piston engine.

The release function is preferably initiated by a pressure present in the discharge line downstream of the pressure limitation valve. To this end, the releasable non-return valve is acted on with a pressure present in a discharge line which is arranged downstream of the pressure limitation valve. The release function of the releasable non-return valve is automatically actuated when a braking effect is produced by the pressure limitation valve. In this instance, downstream of the pressure limitation valve, the pressure in the discharge line increases and actuates the releasable non-return valve.

In order to provide increased pressure for actuating the releasable non-return valve, a pretensioned non-return valve is preferably arranged in the discharge line downstream of the pressure limitation valve. Owing to the pretensioned non-return valve, the pressure in the discharge line that is provided to actuate the releasable non-return valve can be increased via the pressure which is produced owing to the cooler which is arranged in the discharge line.

In order to be able to make provision for a depressurisation of the discharge line when the releasable non-return valve closes again, a throttle location is provided in addition to the pretensioned non-return valve and is arranged parallel with the pretensioned non-return valve. If the releasable non-return valve closes and the pretensioned non-return valve which is provided in the discharge line also closes owing to the resilient load thereof, the remaining pressure in the discharge line is depressurised into the tank volume via the throttle location.

Furthermore, it is advantageous to provide, parallel with the hydraulic motor, a non-return valve which opens in the direction of an upstream connection of the hydraulic motor. Downstream of the hydraulic motor, a throttle is additionally arranged. The combination comprising the throttle which is arranged downstream of the hydraulic motor and the non-return valve which is arranged parallel with the hydraulic motor prevents the formation of a cavitation when the flow of pressure medium to the inlet connection of the hydraulic motor is abruptly switched off as the braking power is decreased. Owing to the provision of the throttle which is arranged downstream, a small amount of pressure is built up downstream of the hydraulic motor and then opens the non-return valve in the direction towards the inlet side of the hydraulic motor. Pressure medium is consequently supplied to the inlet side via the non-return valve which is arranged parallel with the hydraulic motor and the formation of a cavitation is prevented.

The hydrostatic piston engine is furthermore preferably connected to a drive train of the drive by means of a gear stage. The provision of the gear stage as a connection between the hydrostatic piston engine and the drive train allows even low speeds, such as, for example, those on an output shaft of a travel drive, to be transmitted in such a manner that the hydrostatic piston engine operates in an efficiency range which is advantageous for it.

Furthermore, it is advantageous to connect the gear stage to the drive train by means of a decoupler. The provision of such a decoupler allows the energy recovery function or retarder function which is not required to be completely switched off, for example, during transit. In this instance, the efficiency level of the entire drive is increased since a carrying action or churning losses in respect of the hydrostatic piston engine do not occur.

BRIEF DESCRIPTION OF THE DRAWINGS

Advantageous configurations of the drive according to the invention are illustrated in the drawings and are explained in greater detail in the following description.

DETAILED DESCRIPTION OF EXEMPLARY EMBODIMENTS

Figure 1:
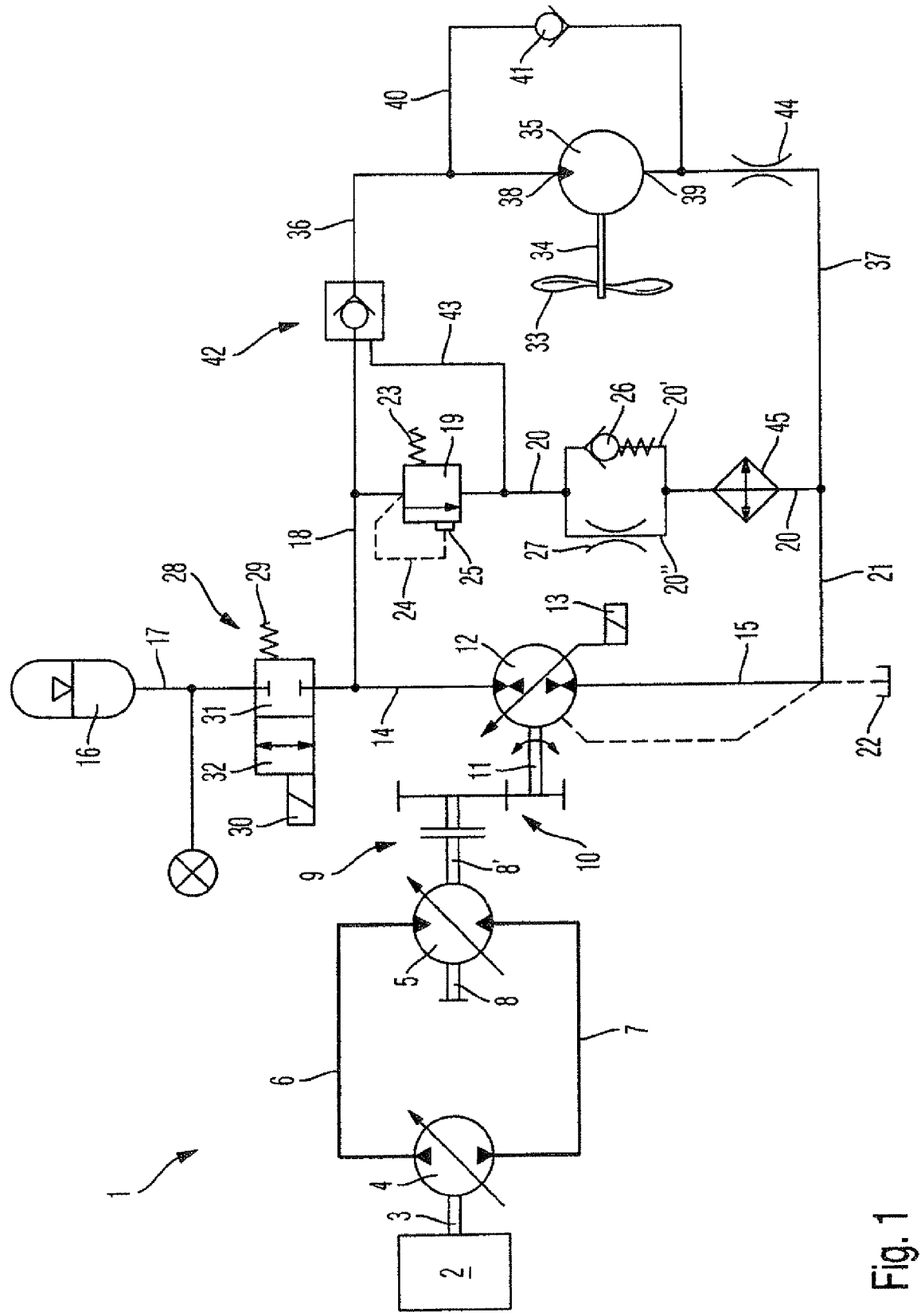
FIG. 1 is a first preferred embodiment of a drive according to the invention.

FIG. 1 schematically illustrates a drive 1 according to the invention. The drive 1 according to the invention comprises a primary drive source which is schematically constructed as a drive motor 2 in the embodiment illustrated. The drive motor 2 is, for example, an internal combustion engine of a utility vehicle. The drive motor 2 is connected to a hydraulic pump 4 by means of a drive shaft 3. The hydraulic pump 4 is preferably constructed for conveying in two directions and can be adjusted in terms of the supply volume thereof. A motor 5 is connected to the hydraulic pump 4 and can be adjusted in terms of the absorption volume thereof. The hydraulic pump 4 and the hydrostatic motor 5 are, for example, hydrostatic axial piston engine of the construction type involving inclined plates or inclined shafts.

The pressure medium conveyed by the hydraulic pump 4 in accordance with the selected supply direction in a first operating line 6 or a second operating line 7 flows through the motor 5 and produces an output torque at the ends 8 and 8' of an output shaft. The output shaft may be constructed, for example, as a continuous output shaft which extends through the motor 5. The end 8 of the output shaft is, for example, connected to a travel drive of a fork lift truck or a construction vehicle. The output shaft may also be connected to a load type gear which is arranged downstream or an additional switching gear.

The end of the 8' output shaft is connected to a gear stage 10 by means of a decoupler 9. By means of the decoupler 9, the torque produced by the motor 5 can be transferred to the gear stage 10. It is insignificant whether the motor 5 is driven by the hydraulic pump 4 during a normal travel operation or the torque is instead produced at the end 8 of the output shaft during overrun operation of the vehicle, owing to the mass inertia of the vehicle. Further reference is made below to the various travel situations in the functional description of the drive 1.

A drive shaft 11 is connected to the gear stage 10 and is connected to a hydrostatic piston engine 12. The hydrostatic piston engine 12 can be adjusted in terms of the displacement volume thereof by means of an adjustment device 13. To this end, the adjustment device 13 acts, for example, on an inclined plate of a hydrostatic piston engine 12 which is of the construction type involving an inclined plate. The hydrostatic piston engine 12 can be used both as a pump and as a motor. Consequently, on the drive shaft 11, there may be produced either a drive torque to drive the hydrostatic piston engine 12 which is then operating as a pump or an output torque by means of one of the hydrostatic piston engine 12 which are operating as a motor.

The following references are first based on the use of the hydrostatic piston engine 12 as a pump. The hydrostatic piston engine 12 is used as a pump to produce a braking effect. Pressure medium is then conveyed into a supply line 14 by means of the hydrostatic piston engine 12. The pressure medium is drawn from a tank volume 22 by means of the hydrostatic piston engine 12 via an intake line 15. The pressure medium conveyed into the supply line 14 by means of the hydrostatic piston engine 12 is conveyed into a store 16. The store 16 has a compressible volume, pressure medium being conveyed into the store 16 by the hydrostatic piston engine 12 as the pressure in the store 16 increases. During the overrun operation or a braking operation of the vehicle, therefore, the decoupler 9 is closed and the speed of the output shaft 8, 8' is converted, by means of the gear stage 10, to an input speed of the drive shaft 11 suitable for the operation of the hydrostatic piston engine 12. A braking function is brought about by the hydrostatic piston engine 12 conveying pressure medium into the store 15 via the supply line 14 and the store line 17 counter to the increasing pressure of the store 16.

If additional intake of pressure medium is not possible by means of the store 16, the maximum permissible pressure of the store 16 must be prevented from being exceeded by the hydrostatic piston engine 12. An excess pressure line 18 is connected to the supply line 14 and opens at a pressure limitation valve 19. If the pressure produced in the supply line 14 by the hydrostatic piston engine 12 exceeds a pressure determined by the pressure limitation valve 19, the pressure limitation valve 19 opens and depressurises the supply line 14 via the excess pressure line 18 in a discharge line 20. The discharge line 20 connects the pressure limitation valve 19 to the tank volume 22 by means of a return line 21.

The pressure limitation valve 19 is acted on in the direction of the closed position thereof by means of a valve spring 23. In the opposing direction, the pressure in the excess pressure line 18 is conveyed to a measuring face 25 by means of a measuring line 24. The pressure in the excess pressure line 18 corresponds to the pressure produced in the supply line 14 by means of the hydrostatic piston engine 12. An opening pressure of the pressure limitation valve 19 can consequently be adjusted by means of the valve spring 23.

If the store reaches the maximum capacity thereof, at which the maximum permissible pressure of the store 16 is reached, the pressure limitation valve 19 opens and the volume supplied by the hydrostatic piston engine 12 is depressurised in the return line 21 towards the tank 22 via the supply line 14, the excess pressure line 18, the pressure limitation valve 19 and the discharge line 20. Owing to the depressurisation at the pressure limitation valve 19, a significant quantity of heat is produced. In this instance, the kinetic energy which is decreased by means of the depressurisation at the pressure limitation valve 19, must be converted completely into heat. A cooler 45 is therefore provided in the discharge line 20. Using the cooler 45, pressure medium flowing through the cooler is cooled on the way to the tank volume 22. Between the cooler 45 and the pressure limitation valve 19, a pretensioned non-return valve 26 is arranged and, parallel therewith, a throttle location 27 is formed. The pretensioned non-return valve 26 is preferably a resiliently loaded non-return valve. For the parallel arrangement of the pretensioned non-return valve 26 and the throttle location 27, the discharge line 20 is divided in one portion into a first discharge line branch 20' and a second discharge line branch 20".

Owing to the parallel arrangement of the pretensioned non-return valve 26 and the throttle location 27, in the portion of the discharge line 20 that is produced between the parallel arrangement and the pressure limitation valve 19, it is possible to adjust a higher pressure relative to the tank volume 22. This increased pressure is also above the pressure present at the inlet side of the cooler 45 and can advantageously be used to switch on or operate an additional cooling device.

As explained above, the store 16 is first filled during a braking operation and the kinetic energy of the vehicle is thus converted into pressure energy which is stored in the store 16. In order to be able to store the stored pressure energy for subsequent recovery in a manner which involves the fewest possible losses, the store line 17 can preferably be separated from the supply line 14. To this end, a switching valve 28 is provided in the store line 17. The switching valve 28 has a spring 29 and an electromagnet 30 which acts on the switching valve 28 in an opposing direction. In place of the electromagnet 30, it is also possible to use any other form of actuator. For example, it is also possible to provide a measuring face which is acted on with a control pressure.

Owing to the force relationship produced between the spring 29 and the electromagnet 30 which acts in the opposing direction, the switching valve can be switched between a first switching position 31 and a second switching position 32. In the first switching position 31, the store line 17 is disengaged. If the switching valve 28 is brought into the second switching position 32 thereof by a control signal acting on the electromagnet 30, a connection through which a fluid can flow is produced in the store line 17 by the switching valve 28.

If a vehicle which is driven by means of the drive 1 illustrated, for example, drives a relatively long distance down an incline, it is, on the one hand, possible to bring about a braking effect by means of a corresponding adjustment of the hydrostatic gear. The hydraulic pump 4 is supported on the drive motor 2. In addition, it is possible to switch on the device for energy recovery and the retarder (brake function by means of the pressure limitation valve 19) using the decoupler 9. During overrun operation of the vehicle, the hydrostatic piston engine 12 is driven by means of the drive shaft 11 and first conveys pressure medium into the store 16 when the electromagnet 30 is supplied with electrical power. If the capacity limit of the store 16 is reached, the control signal of the electromagnet 30 is reset and the connection to the store 16 disengaged. The supply pressure produced by the hydrostatic piston engine 12 in the supply line 14 is depressurised in the tank volume 22 via the pressure limitation valve 19, with heat being produced. The heat is at least partially discharged again into the surrounding air at the cooler 45. In order to increase the cooling capacity of the cooler 45, a cooler fan 33 is provided. The cooler fan 33 is driven by means of a hydraulic motor 35 via a shaft 34. The hydraulic motor 35 is acted on with pressure medium at the inlet side having a hydraulic motor connection line 36. To this end, the hydraulic motor connection line 36 is connected to an inlet connection 38 of the hydraulic motor 35. The pressure medium conveyed by the hydraulic motor 35 is conveyed via a hydraulic motor return line 37 to the return line 21 and thus to the tank volume 22. To this end, the hydraulic motor return line 37 is connected to an outlet connection 39 of the hydraulic motor 37.

In order to drive the hydraulic motor 35, the pressure medium conveyed by the hydrostatic piston engine 12 is used. In the first embodiment illustrated in FIG. 1, there is provision for the hydraulic motor 35 to be acted on with the pressure produced in the supply line 14. To this end, a releasable non-return valve 42 is provided in the hydraulic motor connection line 36. The non-return valve 42 is arranged in the hydraulic motor connection line 36 in such a manner that it opens in the direction towards the supply line 14. Consequently, when pressure is produced in the supply line 14 or the excess pressure line 18, the releasable non-return valve 42 is loaded in the closing direction. A release line 43 is provided for releasing. If the release line 43 directs sufficient pressure, the releasable non-return valve 42 is brought into the open position thereof, regardless of the pressure relationships in the excess pressure line 18 and the hydraulic motor connection line 36. The release line 43 is connected to the discharge line 20 downstream of the pressure limitation valve 19. Preferably, the release line 43 connects the releasable non-return valve 42 to a location of the discharge line 20 upstream of the parallel arrangement of the pretensioned non-return valve 26 and the throttle location 27.

Owing to the pretensioned non-return valve 26 and the throttle location 27, a higher pressure can be provided in the portion of the discharge line 20 that is formed upstream of this parallel arrangement. This higher pressure relative to the tank volume 22 is supplied to the releasable non-return valve 42 by means of the release line 43. The pressure in the line portion of the discharge line 20 upstream of the parallel arrangement is maintained only with the pressure limitation valve 19 open, owing to the throttle location 27. Consequently, the releasable non-return valve 42 is then in each case brought into the released position thereof when a braking effect is produced by means of the pressure limitation valve 19. However, if the pressure produced in the supply line 14 and the excess pressure line 18 by means of the hydrostatic piston engine 12 drops below the opening pressure of the pressure limitation valve 19, the release line 43 is depressurised in the direction of the tank volume 22 via the throttle location 27. Consequently, the releasable non-return valve closes.

As long as the releasable non-return valve 42 is in the released position thereof, part of the pressure medium is removed from the supply line 14 via the excess pressure line 18 and supplied to the hydraulic motor 35 via the hydraulic motor connection line 36.

The hydraulic motor 35 is preferably constructed as a toothed wheel motor and preferably provided for only one flow direction. Owing to the fact that the inlet connection 38 is acted on with the pressure in the supply line 14, the hydraulic motor 35 is driven and transfers a torque to the cooler fan 33 via the shaft 34. The cooler fan 33 is arranged in such a manner that an air flow is produced by the cooler 45 and the cooling performance of the cooler 45 is consequently increased.

Downstream of the hydraulic motor 35, a throttle 44 is formed in the hydraulic motor return line 37. The throttle 44 ensures higher pressure relative to the tank volume 22 during the operation of the hydraulic motor 35 in the portion between the throttle 44 and the outlet connection 39 of the hydraulic motor 35. An auxiliary line 40 is formed parallel with the hydraulic motor and connects the hydraulic motor connection line 36 to the hydraulic motor return line 37. A non-return valve 41 is arranged in the auxiliary line 40. The non-return valve 41 opens in the direction towards the hydraulic motor connection line 36. Owing to the throttle 44 and the non-return valve 41, the production of cavitation is prevented. Cavitation may be produced when the releasable non-return valve 42 returns to the closed position thereof at the end of a braking operation. The pressure at the inlet side of the hydraulic motor 35 then abruptly breaks down with the result that a cavitation can be produced. In order to prevent this, the throttle 44 is provided downstream of the hydraulic motor 35. Upstream of the throttle 44, a higher pressure is provided which leads to the non-return valve 41 opening and pressure medium being conveyed back to the hydraulic motor connection line 36 via the auxiliary line 40. Consequently, the formation of reduced pressure and ultimately the cavitation is effectively prevented.

The descriptions above are based on a drive 1 which has a hydrostatic gear that is preferably part of a drive train. The gear stage 10 is therefore connected to the drive train of the drive 1 by means of the decoupler 9 in order to produce a braking effect. For example, a coupling to an end 8' of the output shaft is illustrated. In a travel drive of this type, the energy recovery is brought about by pressure medium being removed from the store 16. To this end, the switching valve 28 is brought into the second switching position 32 thereof by means of the electromagnet 30. The pressure medium from the store 16, which is in a state of high pressure, is supplied to the hydrostatic piston engine 12 by means of the store line 17 and the supply line 14. The hydrostatic piston engine 12 itself now operates as a motor and, with the pressure being decreased, a torque is produced on the drive shaft 11 by means of the hydrostatic piston engine 12. This torque of the drive shaft 11 is supplied, via the gear stage 10 and the decoupler 9, to the output shaft at the end 8' thereof. The torque produced by the hydrostatic piston engine 12 is consequently available for driving the vehicle.

It can be envisaged that the coupling using the decoupler 9 may also be brought about at any other desired location of the drive train. In particular it is also possible to provide a connection to the drive shaft 3 and thus carry out the energy recovery at the gear inlet side of the hydrostatic gear. In place of a travel drive, a drive of a drive device may also form the basis for the drive 1 according to the invention.

Figure 2:
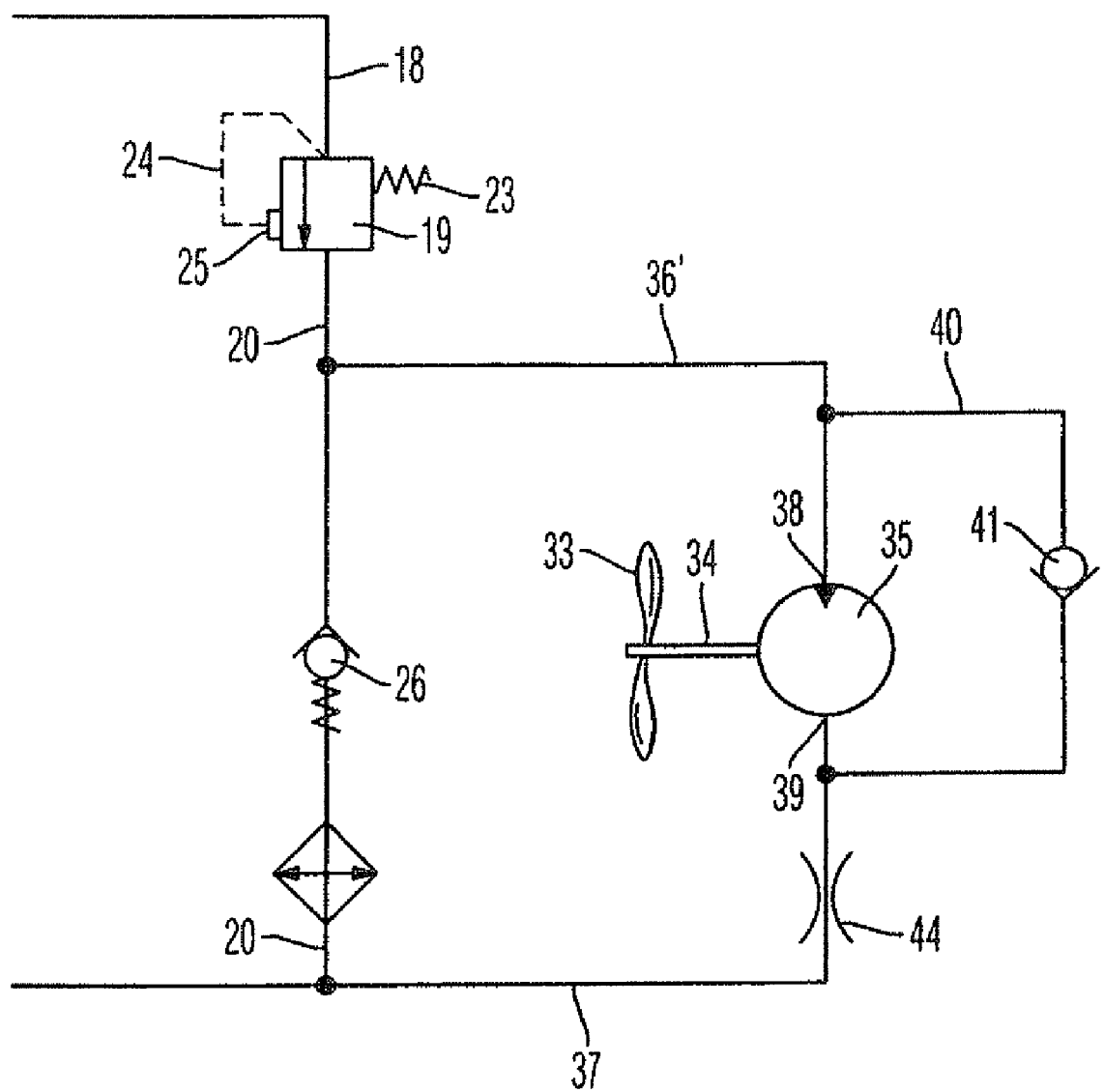
FIG. 2 is a second embodiment having an alternative connection of the hydraulic motor.

FIG. 2 illustrates an alternative connection of the hydraulic motor 35. Identical reference numerals refer to identical elements, a further description of the individual elements being dispensed with wherever this is not required.

The hydraulic motor 35 according to the second embodiment is not acted on with pressure medium from the supply line 14 directly by means of the hydrostatic piston engine. Instead, an increased pressure is produced upstream of the pretensioned non-return valve 26 in the discharge line 20 by means of the pretensioned non-return valve 26. This pressure which is higher relative to the tank volume 22 in the discharge line 20 is supplied to the inlet connection 38 of the hydraulic motor 35 by means of a hydraulic motor connection line 36'. In this particularly simple configuration, the releasable non-return valve 42 which produces the connection of the hydraulic motor 35 to the supply line 14, may be dispensed with. In the discharge line 20, upstream of the pretensioned non-return valve 26, there is in each case a higher pressure relative to the tank volume 22 when a braking effect is achieved by means of the pressure limitation valve 19. Only when producing a braking effect by means of the pressure limitation valve 19 is the pressure limitation valve 19 in the open position. If a braking effect is no longer produced by the pressure limitation valve 19, the pressure limitation valve 19 is brought into the closed position thereof again owing to the force of the valve spring 23. The discharge line 20 upstream of the pretensioned non-return valve 26 is depressurised via the hydraulic motor 35 in the embodiment illustrated.

The invention is not limited to the embodiments illustrated. Instead, combinations of individual features of the illustrated embodiments are also possible.

The invention claimed is:

1. A drive having an energy recovery and retarder function comprising a hydrostatic piston engine which is connected to a store in order to store pressure energy and a pressure limitation valve in order to produce a braking effect, wherein a cooler is arranged downstream of the pressure limitation valve and a hydraulic motor for driving a cooler fan is acted on with pressure medium conveyed by the hydrostatic piston engine, and wherein the cooler is connected to the pressure limitation valve by means of a discharge line and a pretensioned non-return valve is arranged in the discharge line.

2. The drive according to claim 1, wherein an inlet connection of the hydraulic motor is connected to the discharge line upstream of the pretensioned non-return valve.

3. The drive according to claim 1, wherein the hydrostatic piston engine is connected to the store and the pressure limitation valve by means of a supply line and the hydraulic motor is connected to the supply line.

4. The drive according to claim 1, wherein the hydrostatic piston engine is connected to a drive train by means of a gear stage.

5. The drive according to claim 4, wherein the gear stage can be is connected to the drive train by means of a decoupler.

6. The drive according to claim 1, wherein the hydraulic motor is a toothed wheel motor.

7. A drive having an energy recovery and retarder function comprising a hydrostatic piston engine which is connected to a store in order to store pressure energy and a pressure limitation valve in order to produce a braking effect, wherein a cooler is arranged downstream of the pressure limitation valve and a hydraulic motor for driving a cooler fan is acted on with pressure medium conveyed by the hydrostatic piston engine, wherein the hydrostatic piston engine is connected to the store and the pressure limitation valve by means of a supply line, and wherein the hydraulic motor is connected to the supply line by means of a releasable non-return valve.

8. The drive according to claim 7, wherein the releasable non-return valve is acted on with a pressure present in a discharge line which is arranged downstream of the pressure limitation valve.

9. The drive according to claim 7, wherein a pretensioned non-return valve is arranged downstream of the pressure limitation valve, and in that a throttle location is formed parallel with the pretensioned non-return valve.

10. The drive according to claim 7, wherein the hydrostatic piston engine is connected to a drive train by means of a gear stage.

11. The drive according to claim 10, wherein the gear stage is connected to the drive train by means of a decoupler.

12. The drive according to claim 7, wherein the hydraulic motor is a toothed wheel motor.

13. A drive having an energy recovery and retarder function comprising a hydrostatic piston engine which is connected to a store in order to store pressure energy and a pressure limitation valve in order to produce a braking effect, wherein a cooler is arranged downstream of the pressure limitation valve and a hydraulic motor for driving a cooler fan is acted on with pressure medium conveyed by the hydrostatic piston engine, wherein a non-return valve which opens in the direction of an inlet connection of the hydraulic motor is arranged parallel with the hydraulic motor and a throttle is arranged downstream of the hydraulic motor and the non-return valve.

14. The drive according to claim 13, wherein the hydrostatic piston engine is connected to a drive train by means of a gear stage.

15. The drive according to claim 14, wherein the gear stage is connected to the drive train by means of a decoupler.

16. The drive according to claim 13, wherein the hydraulic motor is a toothed wheel motor.

* * * * *